ACCESSORY FOR AUTOMATIC RECORD CHANGER

Filed Feb. 26, 1957 5 Sheets-Sheet 1

INVENTORS

FRED L. BAILEY and
JOHN P. JENKINS

BY Burns, Doane, Benedict & Irons
ATTORNEYS

INVENTORS
FRED L. BAILEY and
JOHN P. JENKINS
BY
Burns, Doane, Benedict & Irons
ATTORNEYS April 4, 1961 F. L. BAILEY ET AL 2,978,249

ACCESSORY FOR AUTOMATIC RECORD CHANGER

Filed Feb. 26, 1957 5 Sheets-Sheet 3

INVENTORS

FRED L. BAILEY and
JOHN P. JENKINS

BY Burns, Doane, Benedict & Irons
ATTORNEYS

INVENTORS
FRED L. BAILEY and
JOHN P. JENKINS
BY
Burns, Doane, Benedict & Irons
ATTORNEYS April 4, 1961 F. L. BAILEY ET AL 2,978,249

ACCESSORY FOR AUTOMATIC RECORD CHANGER

Filed Feb. 26, 1957 5 Sheets-Sheet 5

INVENTORS
FRED L. BAILEY and
JOHN P. JENKINS

BY Burns, Doane, Benedict & Irons
ATTORNEYS

United States Patent Office 2,978,249

Patented Apr. 4, 1961

2,978,249

ACCESSORY FOR AUTOMATIC RECORD CHANGER

Fred L. Bailey, 5 Alexander Court, Normal, Ill., and John P. Jenkins, Bloomington, Ill. (Towanda, Ill.)

Filed Feb. 26, 1957, Ser. No. 642,545

7 Claims. (Cl. 274—10)

This invention relates to automatic record changers for phonographs, and, more particularly, to apparatus for permitting replay of a stack of records after initial automatic playing.

The usual type of drop phonograph record changer provides for automatic sequential playing of a stack of records until the last record is played, but the stack of records must be raised again manually to proper position in order that the stack may be replayed. The apparatus of the present invention is designed to provide for automatic lift of the records on the turntable to the stack position so that the records may be replayed automatically.

Apparatus for raising records from a turntable to stack position to provide for automatic replay is known in the prior art, but prior solutions to the problem have involved complex mechanical arrangements which are unwieldly, difficult to manufacture and maintain, cannot be readily adapted to existing record changing apparatus, and are quite expensive. The apparatus of the present invention depends upon electrical sequence operation and is contrastingly simple to manufacture and maintain. Moreover, the apparatus of the present invention is designed for ready adaptation to existing record players, so that the non-automatic replay type of changer may be readily modified by addition of the present apparatus to provide for automatic replay.

The apparatus of the invention, generally speaking, includes means for elevating records from the turntable to a stack position from which they may be replayed, by the usual record changer apparatus, and means for sensing the end of the last record dropped from the stack onto the turntable, the last means being operable to actuate the elevating means. The apparatus also provides for dynamic braking of the usual turntable motor when the records on the turntable are to be raised to stack position.

The invention will now be more fully described in conjunction with a preferred embodiment thereof shown in the accompanying drawings.

Figure 1:
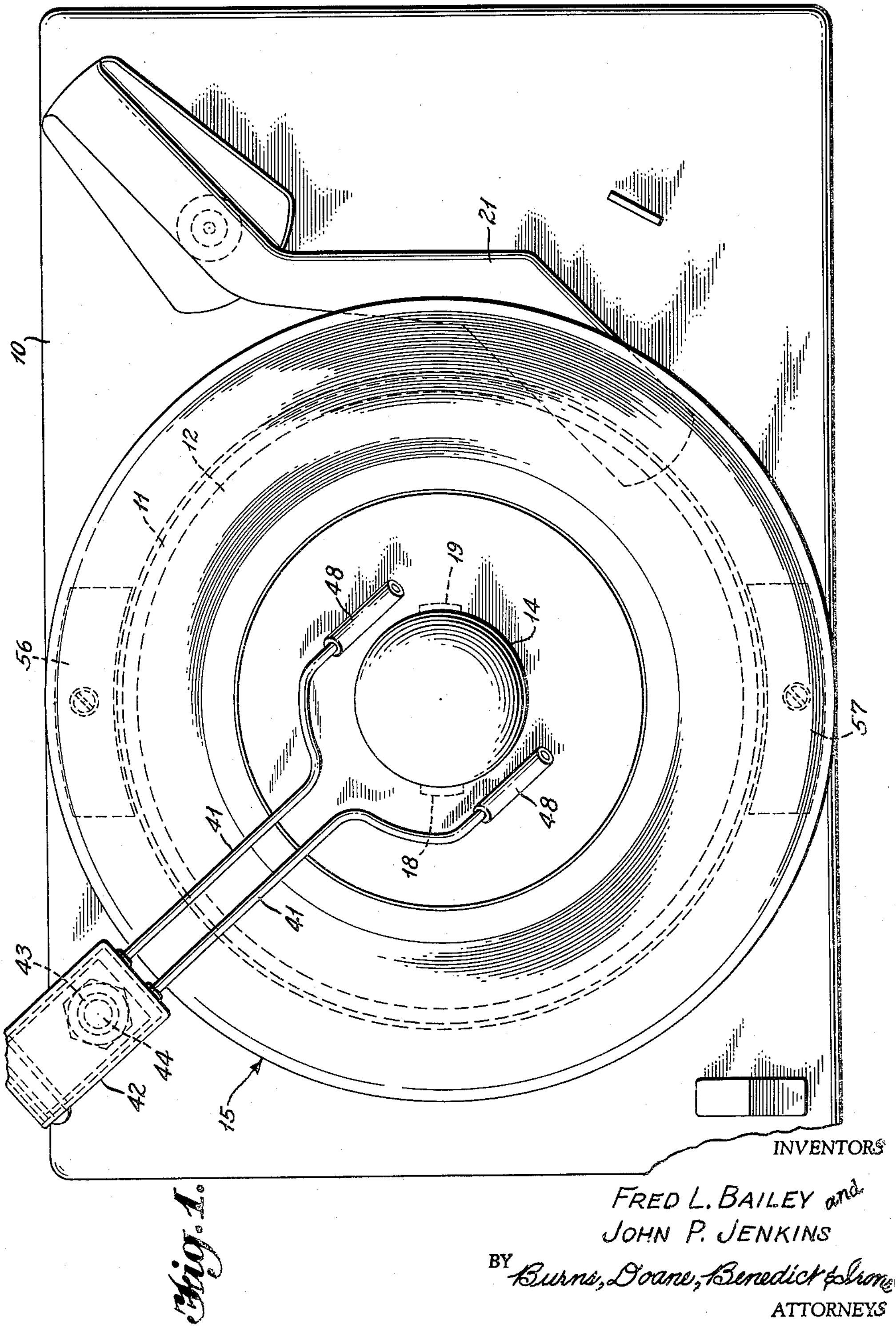
Fig. 1 is a top plan view of a record changing apparatus with the apparatus of the present invention added thereto.

The conventional 45 r.p.m. record changer shown in the drawings will only be described sketchily in this application, since it is a commercial apparatus whose features are well known to the art. Moreover, the record changing apparatus is fully disclosed in a patent to Sperber, 2,706,639, issued April 19, 1955. The record changing apparatus includes a motor board or base 10 having a turntable well 11 in which a turntable 12 is rotatably mounted. The turntable 12 carries a record receiving spindle or center post 13 of relatively large diameter, to the top of which is fixed a cap 14 of the same diameter adapted to receive a stack of records 15. The lowermost record 16 of the stack rests on a pair of oppositely disposed record-supporting shoulders 18, 19 which project from the body of the center post 13. A record 20 is shown carried on the turntable 12.

A tone arm 21 carries a sound reproducing or phonograph pickup device (not shown) within its free end, and the pickup device is provided with a suitable stylus 22 for engaging the sound grooves of the record 20.

The apparatus is also provided with a turntable motor 23 which drives a rubber wheel 24 which engages with the inner peripheral edge of the turntable 12, to rotate the turntable when the motor is energized.

The record changing apparatus is also provided with mechanism to move the tone arm 21 upwardly away from the record 20 on the turntable and outwarly or laterally out from beneath the stack of records 15 positioned by the center post. This apparatus is generally indicated at 25. The record changing apparatus is also provided with apparatus to permit separation of the lowermost record 16 of the stack 15 from the rest of the stack, to permit the lowermost record to be dropped onto the turntable after the record 20 on the turntable has been completed and the tone arm has swung out of the way and to hold the new lowermost record of the stack 15 by the shoulders 18, 19. This apparatus, insofar as shown in the drawings, is generally indicated at 26.

In order to provide for accomplishment of the movement of the tone arm and the release of the lowermost record 16 to fall onto the turntable, the record changer is provided with a record change cycle control element or reciprocating cycling control siled 30, partially supported by an inverted U-shaped guide member 31 which is supported from the bottom of the turntable well. The operation of the slide 30 and its cooperation with the mechanisms 25 and 26 to provide for movement of the tone arm away from the turntable record and out of the way of the stack of records, and to provide for drop of the lowermost record of the stack onto the turntable, will not be more fully described, since these portions of the apparatus are completely described in the Sperber patent, supra. Suffice it to say that, after the record 20 on the turntable is completed, the tone arm 21 is caused to move upwardly and laterally away from underneath the record 16, and the slide 30 moves laterally to the right of Fig. 2 to an extreme position, when the record 16 is dropped onto the turntable, and then the slide 30 returns leftwardly of Fig. 2 to its original position.

The apparatus so far described is that of an automatic record changing phonograph now available on the market and which, in itself, forms no part of the present invention. The apparatus now to be described constitutes additional elements for the automatic record changing phonograph to permit replay of records lying on the turntable.

Figure 8:
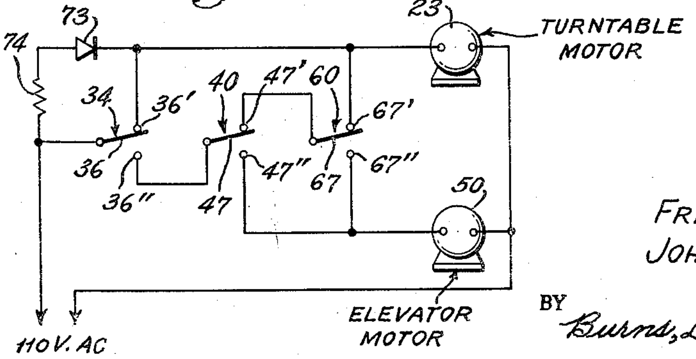
Figure 7:
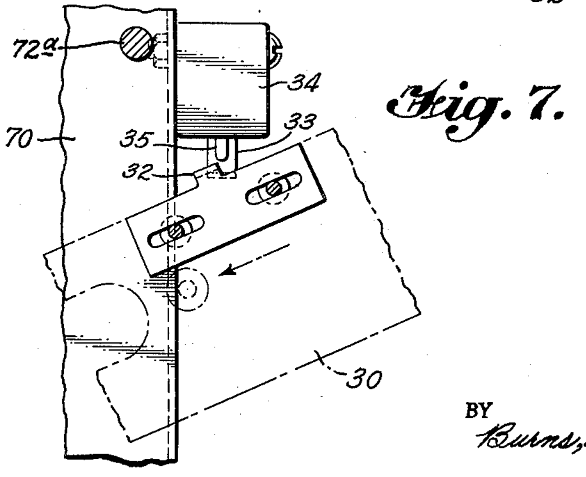
Figs. 6 and 7 are detail views of a portion of the apparatus showing the operation of the slide of the record changer in actuating the end-of-play switch of the invention; and, Fig. 8 is a schematic diagram showing the connections of the various switches and the turntable and elevator motors of the apparatus.
Figure 6:
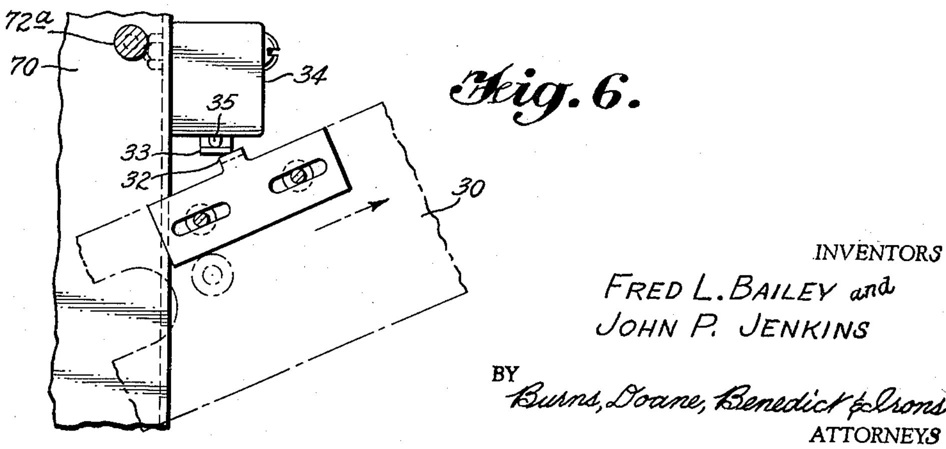

The replay apparatus includes a switch actuator tab 32 which is mounted on the cross slide and projects downwardly therefrom. Mounted in the path of actuator tab 32, as the cross slide 30 moves in its lateral travel is the actuator lever 33 of a switch 34. Switch 34 has a plunger 35 which is contacted by the lever 33 and which controls the position of the movable contact 36 (Fig. 8) of the switch 34. Before the slide 30 starts its movement to the right of Figs. 2 and 3, the plunger 35 is not depressed, and, as seen in Fig. 8, the movable contact 36 is in contact with the stationary contact 36′. However, (Fig. 6) as the cross slide moves to the right, actuator tab 32 strikes the actuator lever 33 and pushes it to depress the plunger 35 and move the movable contact into engagement with stationary contact 36″. The cross slide, in its further movement to the right causes the actuator tab to pass beyond the lever 33 and permit the lever to move back to its normal position, so that switch 34 returns to its normal condition. When the cross slide returns from its movement to the right (Fig. 7), the actuator tab strikes the lever 33 from the opposite direction and has no effect on the position of the switch 34. Therefore, during each outward movement of the cross slide 30, the switch 34 is moved out of its normal position and then back to its normal position. The switch 34, therefore, functions as an end-of-record sensing element.

Figure 5:
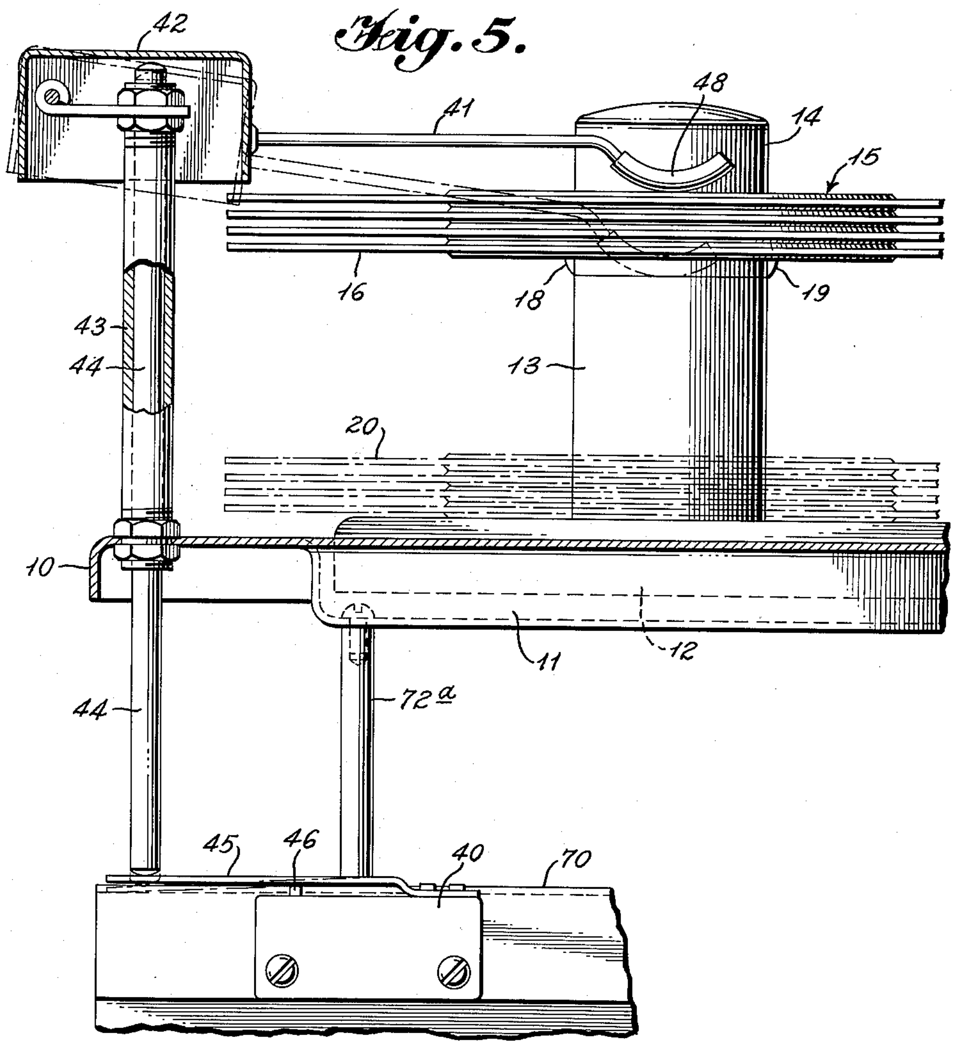
Fig. 5 is a vertical elevational view of a portion of the apparatus, with parts shown in section, showing the operation of the stack sensing switch of the invention.

The apparatus is also provided with an end-of-stack sensing element taking the form of a switch 40. This switch might also be termed a last record-sensing element. As is best shown in Fig. 5, the last record sensing element 40 is controlled by last-record feeler apparatus including a pair of horizontally extending rods 41 each attached at one end to a housing 42 which is supported from the turntable well or base plate 10 by means including a transfer rod housing 43. Within the transfer rod housing is a transfer rod 44 which is free to move vertically within the transfer rod housing and whose lower end extends downwardly into contact with the actuator lever 45 of switch 40. Depression of actuator lever 45 causes inward movement of plunger 46 of the switch, to change the switch position such that the movable contact 47 of the switch (Fig. 8) moves away from stationary contact 47′ into engagement with stationary contact 47″. The laterally-extending feeler rods 41 are provided with elbow-like extensions 48 which are adapted to lie on top of the uppermost record of the stack 15. When the last record of the stack has dropped down onto the turntable, the rods 41 fall by force of gravity to the dash-line position shown in Fig. 5, thereby causing housing 42 to depress the actuator rod 44 and change the position of switch 40.

With this last record sensing apparatus including switch 40, when the last record drops from the stack 15 onto the turntable, the switch 40 is moved to a position such that its movable contact 47 is in engagement with its stationary contact 47″. When a record is placed in stack position, so as to raise the rods 41, the switch 40 is returned to its original position.

The apparatus for elevating or lifting a stack of records from the turntable up into stack position includes an elevator motor generally indicated at 50. The elevator motor, like the turntable motor, is of a conventional A.-C. type and need not be further described here. The motor has a gear reduction apparatus 50*a* associated therewith to reduce the speed of its shaft 51 to a suitable low level for the purpose of elevating the records.

Figure 4:
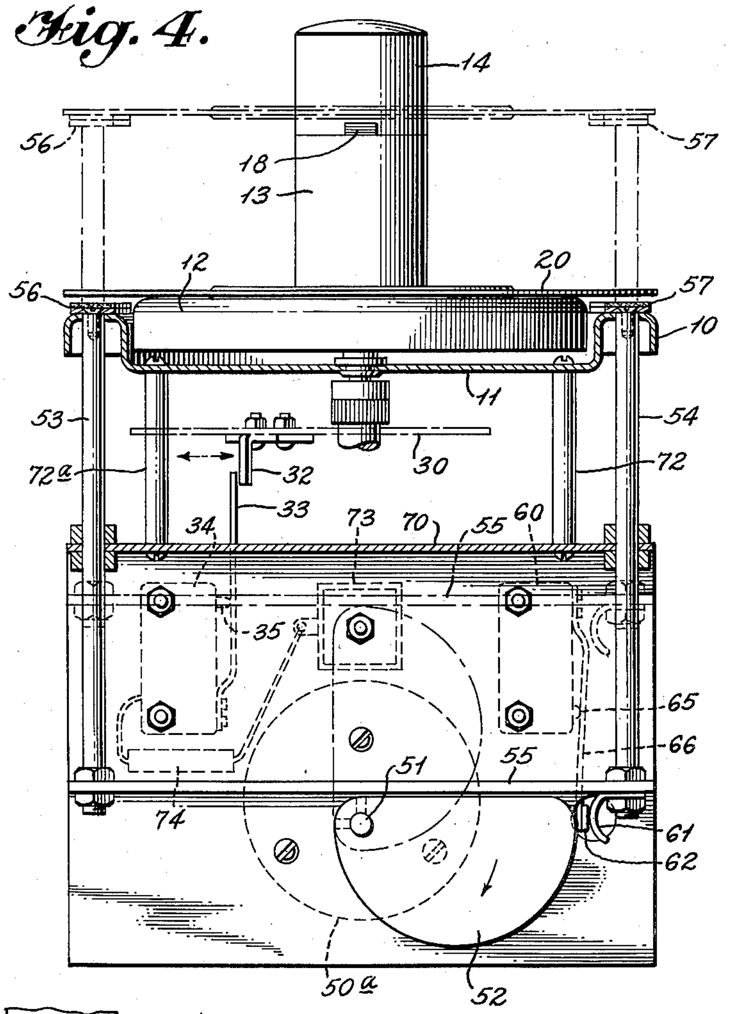
Fig. 4 is a sectional view taken along line 4—4 of Fig. 3.

Mounted on the end of shaft 51 so as to rotate therewith is a semicircular cam 52. As is best shown in Fig. 4, the cam is mounted eccentrically to move from the full-lined position of Fig. 4, in which the flat edge of the cam is horizontal, to the dashed line position, in which the flat edge is vertical. One complete rotation of shaft 51 provides for movement of the cam through a complete revolution to return the cam to its original position.

The cam 52 is intended to control the vertical positions of a pair of lift rods 53 and 54 which are connected by a cross member 55 positioned in the path of travel of the cam. The upper ends of the lift rods 53 and 54 extend through suitable slots in the turntable well or base plate 10 and carry at their upper ends stabilizing caps 56 and 57, which are of arcuate shape, and which are so positioned as to move into contact with the lower side of the lowermost record on the turntable when the rods are moved upwardly. As best shown in Fig. 4, when the cam moves to its dashed line position, the elevator rods 53 and 54 are moved upwardly by the cross member 55 being lifted by the cam, so that the stabilizer caps 56 and 57 carry any records on the turntable to the dashed line position of Fig. 4, this position being above the shoulders 18, 19. The shoulders then operate to hold the records in stack position for automatic replay of the records.

Figure 2:
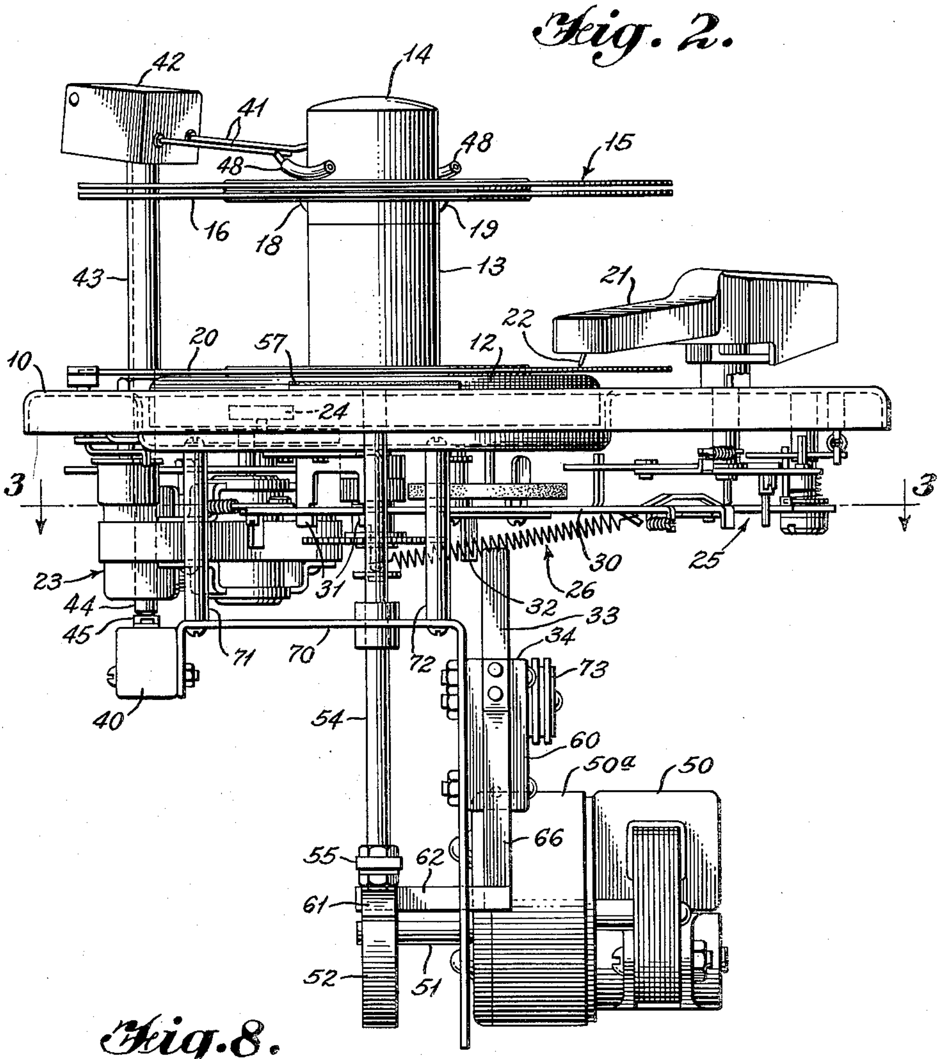
Fig. 2 is a vertical elevational view of the apparatus of Fig. 1.
Figure 3:
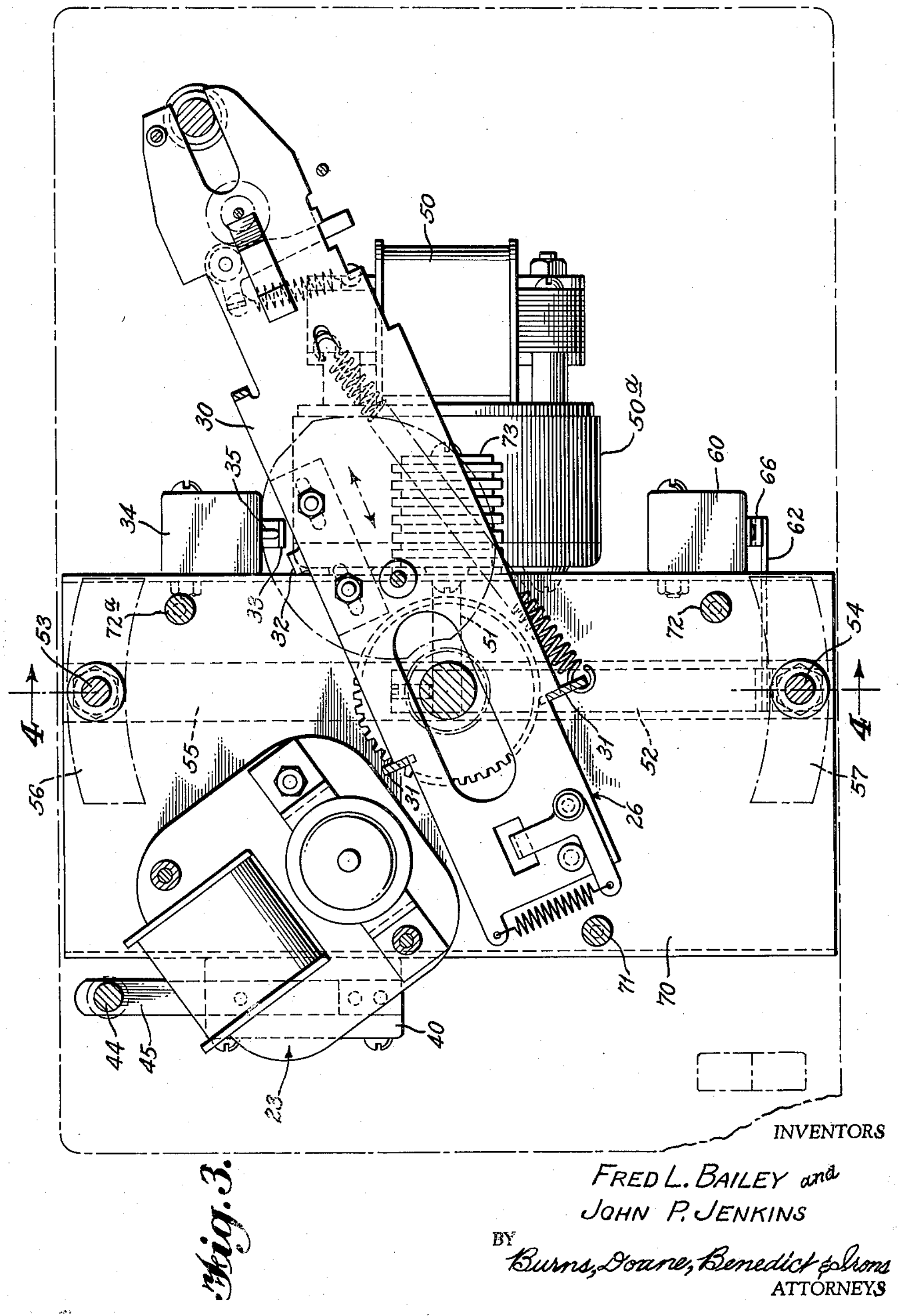
Fig. 3 is a sectional view taken along line 3—3 of Fig. 2.

In order to sense the operation of the elevator motor 50, the apparatus is provided with a switch 60 whose position is controlled by an actuator tab 61 carried at the lower side of the elevator cross member 55. As best seen in Figs. 2 through 4, the tab 61 normally presses an actuator lever 62 to the left of Fig. 4, to maintain the plunger 65 of switch 60 depressed. The plunger is contacted by a switch lever 66 which is attached to the actuator lever 62. With the switch 60 in this normal position, the movable contact 67 is maintained in contact with stationary contact 67′ (Fig. 8). When the cross member 55 is moved upwardly by the cam 52 during operation of the elevator motor, the actuator tab 61 moves upwardly to clear the lever 62 and permit the plunger 65 to move outwardly and reverse the position of the switch. When the cam returns from its dashed-line position to its full-line position (Fig. 4), the elevator cross member 55 moves downwardly again by force of gravity and the tab 61 comes into contact with lever 62 and depresses the plunger 65 once more.

The apparatus above described, including the switches 34, 40, and 60, and the elevator motor 50, together with the apparatus associated therewith, are mounted from an L-shaped chassis 70 which is in turn supported from the turntable well or base plate 10 by means of spacers 71, 72 and 72*a*.

Also mounted on the chassis 70, and shown in Fig. 8, as well as Figs. 4 and 2, are a half-wave selenium rectifier 73 and a resistor 74.

Referring specifically to Fig. 8, one side of each of the turntable motor 23 and the elevator motor 50 is connected to one side of a source of alternating current supply (not shown). The other side of the supply is connected in multiple to the movable contact 36 of the end-of-record sensing switch 34 and one side of resistor 74. The other side of resistor 74 is connected through the selenium rectifier 73 to the stationary contact 36′ of switch 34, to the stationary contact 67′ of the switch 60 which senses operation of the elevator motor, and to the other side of the turntable motor 23. The stationary contact 36″ of switch 34 is connected to the movable contact 47 of last-record sensing switch 40. The stationary contact 47′ of switch 40 is connected to the movable contact 67 of the elevator sensing switch 60. The stationary contacts 47″ and 67″ of switches 40 and 60 are connected to the other side of the elevator motor 50.

In operation of the apparatus above described, each time that a record on the turntable is completed, the cross slide 30 moves to the right of Fig. 2 to carry the actuator tab 32 into contact with lever 33 and change the position of switch 34 so that its movable contact is in engagement with stationary contact 36″. However, as long as there are records in stack position, that is, positioned in a stack 15 above the turntable, there is no change in operation of the apparatus, because a circuit to the turntable motor is completed through switch 34, switch 40 and switch 60.

When the last record is dropped from stack 15 down onto the turntable, the feeler rods 41 move to lower the transfer rod 44 and depress the plunger of last-record sensing switch 40. This causes movement of the movable contact of switch 40 into engagement with stationary contact 47″. This does not cause cessation of operation of the turntable motor, but, when the last record is completed, and the cross slide 30 moves to the right of Fig. 2 again to change the position of end-of-record sensing switch 34, the normal energizing circuit for the turntable motor is interrupted, and an energizing circuit for the elevator motor 50 is completed through switches 34 and 40. The short across the series combination of rectifier 73 and resistor 44 normally supplied by switch 34 is now opened, so that the rectifier is in series with the turntable motor. The rectifier operates to furnish direct current to the turntable motor and dynamically brake the motor to cause it to cease rotation immediately. The cross slide 30 therefore stops with switch 34 in its actuated position.

The elevator motor 50 is then operated to cause rotation of cam 52 to raise the lift rods 53 and 54. The upward movement of the lift rods causes the actuator tab 61 to clear actuator lever 62 and permit the plunger 65 of the elevator sensing switch 60 to move the movable contact of the switch into engagement with stationary contact 67″. Thereby, an auxiliary circuit for operation of the elevator motor is prepared. As the lift rods 53 and 54 move upwardly, they carry the stabilizing caps 56 and 57 upwardly, to raise the entire stack of records from the turntable up above the shoulders 18 and 19 on center post 13. The cam is at this time in its extreme position, and, as it moves further, the lift rods are cause to be lowered and the stack of records is maintained in stacked position by the conventional apparatus of the record changer.

When the stack of records moved into stack position, the last-record feelers were moved upwardly to allow the transfer rod 44 to move upwardly and thereby return switch 40 to its original position with contact 47 in engagement with contact 47′. However, the energizing circuit for the elevator motor is not interrupted because of the auxiliary circuit through switch 60 previously prepared.

As the cam 52 continues its movement, the lift rods 53 and 54 are lowered to a position such that the actuator tab 61 again contacts actuator lever 62 and causes switch 60 to change its position such that movable contact 67 is in engagement with stationary contact 67′. At this time, the energizing circuit for the elevator motor is interrupted at switch 60, and an energizing circuit for the turntable motor is completed through switches 34, 40, and 60, thereby shorting the rectifier 73 and causing the turntable motor to begin rotating again. This movement of the shaft of the turntable motor causes renewed rotation of the turntable, but it also causes further movement of cross slide 30 to the right of Fig. 2 until the outer limit of movement is reached. This provides for change in the position of switch 34, with movable contact 36 coming into engagement with stationary contact 36′. The lowermost record 16 of the stack 15 is then dropped onto the turntable and the cross slide 30 returns to its original position.

Play now begins of the lowermost record, and automatic play and change takes place in sequence until the last or uppermost record of the stack is dropped onto the turntable, when the sequence of operations described takes place once more. It is evident, then, that the records placed on the center post at the beginning of operation of the apparatus will be continually replayed over and over, so that an unlimited amount of entertainment may be had from the phonograph.

The preferred embodiment of the invention described above in conjunction with the drawings was particularly designed for a 45 r.p.m. record changer of well known commercial type. However, it is evident that the same principles of design could be used in conjunction with any other type of automatic record changer. Therefore, the invention is not to be considered limited to the particular embodiment described above. Moreover, many minor changes obviously could be made in the apparatus of the invention without departure from the scope thereof. Therefore, the invention is not to be considered limited to the arrangement and embodiment described, but only by the scope of the appended claims.

We claim:

1. In combination with an automatic record changing phonograph including a turntable, a turntable motor operable when energized to rotate the turntable, and means operable after completion of a record on the turntable to drop a record from a stack onto the turntable, apparatus for elevating records from the turntable back to stack position for replay comprising means including an elevator motor operable when the motor is energized to lift the records from the turntable back to stack position, first and second switches each capable of occupying a pair of positions, said first switch in its first position being operable to complete an energizing circuit for said turntable motor, said first switch in its second position and said second switch in its first position being operable together to complete an energizing circuit for said turntable motor, said first and second switches in their second positions being operable together to complete an energizing circuit for said elevator motor, means for changing said first switch to its second position and then back to its first position after completion of the record on the turntable, and means for changing said second switch to its second position when the last record in the stack is dropped onto the turntable and back to its first position when a record is placed in stack position.

2. The apparatus of claim 1 including means for braking the turntable motor when the first and second switches are moved to their second positions.

3. In combination with an automatic record changing phonograph including a turntable, a turntable motor operable when energized to rotate the turntable, and means operable after completion of a record on the turntable to drop a record from a stack onto the turntable, apparatus for providing for replay of records on the turntable comprising means including an elevator motor operable when the motor is energized to lift the records from the turntable back to stack position, first, second and third double throw switches, said first switch in its first position being operable to complete an energizing circuit for said turntable motor, said first switch in its second position and said second and third switches in their first positions being operable together to complete an energizing circuit for said turntable motor, said first and second switches in their second positions being operable together to complete an energizing circuit for said elevator motor, said first and third switches in their second positions and said second switch in its first position being operable to complete an energizing circuit for said elevator motor, means for changing said first switch to its second position and then back to its first position after completion of the record on the turntable, means for changing said second switch to its second position when the last record in the stack is dropped onto the turntable and back to its first position when a record is placed in stack position, and means for changing said third switch to its second position when said means including an elevator motor begins to lift the records and back to its first position when the records have been placed in stack position.

4. The apparatus of claim 3 in which both the turntable and elevator motors are of the A.-C. type, and including rectifying means connected across the first switch when in its first position and operable to brake the turntable motor when the first switch is moved to its second position and one of said second and third switches is in its second position.

5. In combination with an automatic record changing phonograph including a turntable, a tone arm positionable above a record on the turntable to play the record and movable laterally away from the record after the record is played, means for holding a stack of records above the turntable and for dropping the lowermost record of the stack upon the turntable when the uppermost record thereon has been played and the tone arm has been moved out of the way, and a turntable motor operable when energized to rotate the turntable and to actuate said holding means and move said tone arm at appropriate times, apparatus for providing for replay of records on the turntable comprising means including an elevator motor and an electrical energizing circuit, said circuit including first, second and third double throw switches, one of the stationary contacts of each of the first and third switches being connected to one side of the turntable motor and another one of the stationary contacts of each of the second and third switches being connected to one side of the elevator motor, the other one of the stationary contacts of the first switch being connected to the movable contact of the second switch, the movable contact of the first switch being connected to one side of said circuit and the other sides of the motors being connected to the other side of said circuit, means for moving the movable contact of the first switch first into contact with said one stationary contact and then into contact with said other stationary contact when the record on the turntable is completed and the tone arm has moved out of the way of records on the stack, means responsive to presence of records in stack position operable to move the movable contact of the second switch into contact with said other stationary contact when the last record from the stack is dropped onto the turntable and to move the movable contact into contact with said one stationary contact when records are placed in stack position, and means responsive to operation of the means including an elevator motor for moving the movable contact of the third switch into contact with said other contact when elevation is begun and for moving the movable contact into contact with said one contact after elevation is completed.

6. The apparatus of claim 5 including a rectifier connected between the movable contact and said one stationary contact of said first switch operable to brake the turntable motor when elevation is begun.

7. In combination with an automatic record changing phonograph including a turntable, a turntable motor operable when energized to rotate the turntable, and means operable after completion of a record on the turntable to drop a record from a stack onto the turntable, said last-named means including a member movable linearly from a normal position to an extreme position to effect the drop and then from the extreme position to its normal position, apparatus for providing for replay of records on the turntable comprising electrically-operated means for translating records from the turntable back to stack position, and means responsive to completion of the last record from the stack operable to energize said translating means, said responsive means including a switch having an actuating element operable when moved in one direction to change the position of the switch from a first to a second position and when moved in the opposite direction to change the position of the switch back to the first position, said member being operable when moved from its normal position to its extreme position to move the switch actuating element first in said one direction and then in the opposite direction and when moved from its extreme position to its normal position to move the switch actuating element in the opposite direction, whereby said switch has its position changed only during movement of the member from its normal position to its extreme position.

References Cited in the file of this patent

UNITED STATES PATENTS

| | | |
|---|---|---|
| 2,090,746 | Compare | Aug. 24, 1937 |
| 2,527,586 | Small | Oct. 31, 1950 |
| 2,546,136 | Ristau et al. | Mar. 20, 1951 |
| 2,611,619 | Cambron et al. | Sept. 23, 1952 |
| 2,657,061 | Sperbert | Oct. 27, 1953 |
| 2,685,447 | Ristau et al. | Aug. 3, 1954 |
| 2,777,699 | Woodruff | Jan. 15, 1957 |